United States Patent Office 3,696,062
Patented Oct. 3, 1972

3,696,062
COMPOSITIONS CONTAINING AMORPHOUS 1,2-POLYBUTADIENE
Jean Lesage, Le Vesinet, and Francois Dawans, Bougival, France, assignors to Institut Francais du Petrole, des Carburants et Lubrifiants, Rueil Malmaison (Hauts-de-Seine), France
No Drawing. Filed Oct. 8, 1970, Ser. No. 79,286
Claims priority, application France, Oct. 21, 1969, 6936148
Int. Cl. C08c 9/04
U.S. Cl. 260—5    6 Claims

ABSTRACT OF THE DISCLOSURE

The new compositions consisting of 50–95% by weight of natural rubber and 5–50% by weight of amorphous 1,2-polybutadiene may be subjected to vulcanization treatments, thus resulting in vulcanizates of improved mechanical properties and stability.

---

This invention relates to new compositions containing amorphous 1,2-polybutadiene of high molecular weight.

These compositions consist essentially of mixtures, in critical proportions, of natural rubber and amorphous 1,2-polybutadiene of high molecular weight.

Although natural rubber is broadly used in industry, for example for manufacturing tires, damping rubber articles and such articles as driving belts, this material has inherent defects which it has not been possible, up to now, to obviate in an altogether satisfactory manner.

Thus, natural rubber cannot be admixed easily with charges, such as carbon black. Moreover, when more than 45% by weight of carbon black is admixed with natural rubber, the mechanical characteristics of the latter substantially decrease, and the mixture cannot be processed easily.

When subjected to vulcanization under conventional conditions, natural rubber gains good mechanical properties. However, when the vulcanization temperatures are increased in an attempt to speed up the output rates, the mechanical properties sharply decrease.

Moreover, natural rubber has poor characteristics of resistance to ageing and remanence to compression, and it would be beneficial to improve the latter.

Finally, the reversion ratio of vulcanizates obtained from natural rubber (i.e. the relative loss of mechanical properties resulting from multiplying, for example by four, the optimal vulcanization time) is rather high, and it would also be beneficial to reduce it.

This invention has for an object new compositions which have, in the vulcanized state, a surprisingly reduced reversion ratio; moreover, they can be processed easily and retain good mechanical properties even when additional charges have been added thereto in as high amounts as 65% or even 80% with respect to their own weight.

They also have a better behavior when vulcanized at a high temperature, and an improved resistance to ageing and remanence to compression as compared to natural rubber.

These properties will be shown in the experiments described hereinafter.

The compositions of this invention consist essentially of mixtures of natural rubber (1,4 cis polyisoprene) and amorphous 1,2-polybutadiene such as hereinafter defined, said mixtures having a natural rubber content by weight of 50 to 95%, and preferably 70 to 90%, and a 1,2-polybutadiene content by weight of 5 to 50%, and preferably 10 to 30%.

Amorphous 1,2-polybutadiene which is used in the compositions of this invention, has a 1,2-units content of at least 90%, a crystallinity ratio at 20° C. lower than 2% and an average molecular weight of at least 50,000.

These characteristics may be determined as follows:

The 1,2-units content by infra-red spectrometry according to Ciampelli et al. in La Chemica e l'Industria 41, 1959, page 758.

The average molecular weight by light diffusion,

The crystallinity ratio at 20° C. by X-rays spectography, for example according to the method of the Belgian Pat. No. 549,554 of Jan. 14, 1957, or the French Pat. 1,154,938 (U.S. Pat. No. 2,905,646).

These amorphous 1,2-polybutadienes are practically free of gel and are soluble in a number of common solvents, for example benzene, toluene, chloroform or carbon sulfide. They have been described, as well as their manufacture, for example in USP 3,451,987.

It will be appreciated that the mixtures of natural rubber and amorphous 1,2-polybutadiene which contain more than 50% of amorphous 1,2-polybutadiene have poor mechanical properties, particularly a poor resistance to breaking. These compositions are not within the scope of this invention.

The preferred compositions are those which have a satisfactory brittle point, for example a brittle point lower than −45° C. which is, as a rule, the highest value accepted by tire manufacturers. These preferred compositions have an amorphous 1,2-polybutadiene content lower than 30%.

The minimal content by weight of amorphous 1,2-polybutadiene in the compositions of this invention is 5%, and preferably 10%.

These new compositions may be obtained by any conventional technique for admixing elastomers. For example, the constituents may be admixed in a roll-mixer at any convenient temperature, for example 30 to 80° C.

During this operation, conventional additives may be incorporated into the mixture, for example antioxidants, such as phenyl-β-naphthylamine or tert. butyl para-cresol, various charges, such as carbon black, hydrocarbon oils, vulcanization agents, such as sulfur, vulcanization accelerators such as N-cyclohexyl-2-benzothiazyl sulfenamide, or again zinc oxide or stearic acid.

The resulting product may be vulcanized in a press under known conditions of temperature (about 130–180° C., preferably 150° C.) and pressure (for example 1 to 100 bars, preferably about 70 bars).

The following examples show the improved properties of the compositions of this invention, as compared to those of natural rubber alone.

EXAMPLES

Natural rubber has been admixed with 1,2-polybutadiene having a crystallinity ratio at 20° C. lower than 2%, an average molecular weight of 400,000 and a 1,2-units content of 91%.

The following additives have been admixed with 100 g. of either natural rubber (crude gum) or mixtures containing the same:

| | G. |
|---|---|
| Phenyl-β-naphthylamine | 1 |
| Aromatic oil | 3 |
| Carbon black (ISAF) | 45 |
| Stearic acid | 3 |
| Condensation product of diphenylamine with acetone | 1 |
| Sulfur | 2.5 |
| Zinc oxide | 5 |
| N-cyclohexyl-2-benzothiazyl sulfenamide | 0.6 |

The resulting mixtures have been subjected to the following treatments:

Mechanical properties (ASTM D-412 corresponding to the French NF T 46,002 standard).

Table I shows that the vulcanization at high temperature results in very high moduli for the mixtures of natural rubber with amorphous 1,2-polybutadiene.

TABLE I

| | Vulcanization: 9 minutes at 160° C. | | Vulcanization: 3 minutes at 180° C. | |
|---|---|---|---|---|
| | CN[1] | 60% CN[1] 40% PVB[2] | CN[1] | 60% CN[1] 40% PVB[2] |
| Modulus 300% kgf./cm.² | 125 | 150 | 80 | 130 |

[1] CN = natural rubber.
[2] PVB = amorphous 1,2-polybutadiene.

Reversion ratio

The reversion ratio is defined as the percent loss of the mechanical properties of the vulcanizates when the optimal vulcanization time is multiplied by four. Table II shows that this ratio is surprisingly improved when amorphous 1,2-polybutadiene is admixed with natural rubber, particularly in the high temperature test (180° C.).

TABLE II

| | Vulcanization temperature | | | |
|---|---|---|---|---|
| | 160° C. | | 180° C. | |
| | CN[1] | 60% CN[1] 40% PVB[2] | CN[1] | 60% CN[1] 40% PVB[2] |
| Breaking resistance, percent | 30 | 11 | 37 | 14 |
| Modulus at 300 percent | 30 | 13 | 50 | 12 |

See footnotes, Table I.

Stability to ageing (ASTM D-573 corresponding to the French standard NF T 46,004).

The experiment has been carried out for 7 days at 85° C. in a Geer oven.

Table III shows that when 25% of natural rubber is substituted with amorphous 1,2-polybutadiene, a substantial improvement of the ageing stability is obtained. This is expressed by the percent loss of mechanical properties with respect to the initial properties, before ageing.

TABLE III

| | CN[1] | 25% PVB[2] 75% CN[1] |
|---|---|---|
| Breaking resistance, percent | −37 | −20 |
| Lengthening at rupture, percent | −45 | −32 |

See footnotes, Table I.

Remanence to compression (ASTM D 395 corresponding to the French standard NF T 46,011).

The test had been carried out on natural rubber and on a mixture of 25% amorphous 1,2-polybutadiene and 75% natural rubber. The results of experiments for 22 hours at 70° C. and 70 hours at 100° C., respectively, are given in Table IV.

TABLE IV

| | CN[1] | 25% PVB[2] 75% CN[1] |
|---|---|---|
| 22 h. at 70° C., percent | 23.9 | 21.6 |
| 70 h. at 100° C., percent | 60 | 41.8 |

See footnotes, Table I.

Amorphous 1,2-polybutadiene improves the remanence to compression of natural rubber.

What we claim as this invention is:

1. A vulcanizable composition containing as the elastomeric component essentially only a mixture of natural rubber and 1,2-polybutadiene containing at least 90% of 1,2-units, having a crystallinity ratio at 20° C. of at most 2% and an average molecular weight of at least 50,000, said mixture having a content by weight of natural rubber of 50 to 95% and a content by weight of said 1,2-polybutadiene of 5 to 50%, said composition having, as compared to natural rubber by itself, an improved modulus of sulfur vulcanizates thereof, an improved reversion ratio, an improved stability to ageing, and an improved remanence to compression.

2. A composition according to claim 1, wherein the mixture has a content by weight of natural rubber of 70 to 90% and a content by weight of 1,2-polybutadiene of 10 to 30%.

3. A sulfur vulcanizate of the composition of claim 1.

4. A sulfur vulcanizate of the composition of claim 2.

5. A composition as defined by claim 1 wherein said composition has a brittle point below lower than −45° C. and wherein the content of 1,2-polybutadiene is less than 30%.

6. A sulfur vulcanizate of the composition of claim 5.

References Cited

UNITED STATES PATENTS 3,366,585  1/1968  Davidson et al.  260—894
3,166,609  1/1965  Wilder           260—894

JOHN C. BLEUTGE, Primary Examiner

U.S. Cl. X.R.

260—23.7 M, 33.6 AQ, 41.5 R, 45.9 R, 79.5 B